(12) United States Patent
Dinsmoor et al.

(10) Patent No.: US 8,583,954 B2
(45) Date of Patent: Nov. 12, 2013

(54) POWER SOURCE COUPLING AND DECOUPLING IN MEDICAL DEVICE

(75) Inventors: David A. Dinsmoor, St. Paul, MN (US);
Joel A. Anderson, Brooklyn Park, MN (US); Matthew J. Michaels, St. Francis, MN (US); Timothy J. Denison, Minneapolis, MN (US); Michael E. Newell, St. Anthony, MN (US)

(73) Assignee: Medtronic, Inc., Minneapolis, MN (US)

( * ) Notice: Subject to any disclaimer, the term of this patent is extended or adjusted under 35 U.S.C. 154(b) by 431 days.

(21) Appl. No.: 12/879,164

(22) Filed: Sep. 10, 2010

(65) Prior Publication Data

US 2012/0066534 A1 Mar. 15, 2012

(51) Int. Cl.
*G06F 1/00* (2006.01)
*H02H 3/00* (2006.01)
*H02H 7/00* (2006.01)

(52) U.S. Cl.
USPC .......... 713/340; 361/1; 361/5; 361/6; 361/21; 361/230

(58) Field of Classification Search
USPC .................. 713/340; 361/1, 5, 6, 21, 230
See application file for complete search history.

(56) References Cited

U.S. PATENT DOCUMENTS

| | | | |
|---|---|---|---|
| 4,800,883 A | 1/1989 | Winstrom | |
| 5,856,738 A | 1/1999 | Yoshimatsu | |
| 5,916,237 A | 6/1999 | Schu | |
| 6,121,693 A * | 9/2000 | Rock | 307/18 |
| 6,194,872 B1 | 2/2001 | Schnell | |
| 6,453,198 B1 | 9/2002 | Torgerson et al. | |
| 6,557,106 B1 * | 4/2003 | Yuzawa et al. | 713/300 |
| 6,934,135 B1 * | 8/2005 | Ryan | 361/23 |
| 7,161,816 B2 * | 1/2007 | Shteynberg et al. | 363/21.13 |
| 7,496,404 B2 | 2/2009 | Meadows et al. | |
| 7,571,008 B2 | 8/2009 | Dinsmoor et al. | |
| 7,800,869 B1 * | 9/2010 | Daugherty | 361/18 |
| 8,031,449 B2 * | 10/2011 | Burns et al. | 361/90 |
| 2001/0015635 A1 * | 8/2001 | Leppo et al. | 320/116 |
| 2002/0135235 A1 * | 9/2002 | Winick et al. | 307/87 |
| 2003/0149459 A1 | 8/2003 | Von Arx et al. | |
| 2006/0190060 A1 | 8/2006 | Greeninger et al. | |
| 2007/0060967 A1 | 3/2007 | Strother et al. | |
| 2007/0060968 A1 | 3/2007 | Strother et al. | |
| 2008/0030166 A1 * | 2/2008 | Cato et al. | 320/111 |
| 2008/0184256 A1 * | 7/2008 | Felter et al. | 718/105 |
| 2010/0014203 A1 * | 1/2010 | Teggatz et al. | 361/91.1 |
| 2010/0039836 A1 * | 2/2010 | Gong et al. | 363/21.13 |
| 2011/0285456 A1 * | 11/2011 | Thornton et al. | 327/541 |

* cited by examiner

*Primary Examiner* — Vincent Tran

(74) *Attorney, Agent, or Firm* — Shumaker & Sieffert, P.A.

(57) ABSTRACT

Aspects of this disclosure relate to coupling and decoupling a power source of a device with circuitry within the device. For example, in aspects of this disclosure, when a short develops within the device, a switch circuit may decouple the power source from the some of the circuitry within the device. Decoupling the power source when a short develops may extent the operational time of the power source, and may reduce thermal excursion.

25 Claims, 7 Drawing Sheets

POWER SOURCE COUPLING AND DECOUPLING IN MEDICAL DEVICE

TECHNICAL FIELD

This disclosure is directed to techniques for coupling and decoupling a power source from circuitry in a medical device.

BACKGROUND

Electronic devices, such as medical devices, often make use of one or more rechargeable or non-rechargeable power sources, such as batteries, to provide operating power to circuitry of the device. In some examples, when the device is in a non-operational state, e.g., not being used, the circuitry may be placed in a low power mode. However, even in low power mode, the circuitry may still consume some amount of power that may cause the power source to drain over time. Also, in some instances, when the device is an operational state, e.g., being used, or non-operational state, it may be possible for a short to develop within the circuitry. A short may be an unintended current path from a positive node of the power source to a negative node of the power source. When a short develops in the circuitry, the power source may drain quickly.

SUMMARY

In general, this disclosure describes techniques of coupling and decoupling a power source of a medical device with circuitry within the device. In some examples, the medical device may be an implantable medical device. As one example, the power source may be coupled to a switch circuit. The switch circuit may output a voltage that provides power for the circuitry within the medical device. The switch circuit may be directly coupled to a switch controller. When the medical device is in a non-operational state, or when the output of the switch circuit drops below a threshold, the switch controller may cause the switch circuit to be in an opened state. In the opened state, the switch circuit may decouple the power source from the circuitry within the medical device. When the medical device is in an operational state, the switch controller may cause the switch circuit to be in a closed state. In the closed state, the switch circuit may couple the power source to the circuitry within the medical device.

In one example, aspects of this disclosure are directed to a medical device comprising a switch circuit comprising a source terminal, a drain terminal, and a gate terminal, wherein the source terminal is coupled to a power source, a switch circuit controller coupled directly to the drain terminal and the gate terminal of the switch circuit and configured to monitor a voltage at the drain terminal of the switch circuit, and output a voltage to the gate terminal of the switch circuit to transition the switch circuit from a closed state to an open state when the voltage at the drain terminal of the switch circuit is less than a predetermined voltage threshold.

In another example, aspects of this disclosure are directed to a method comprising monitoring a voltage at a drain terminal of a switch circuit, within a medical device, wherein the switch circuit comprises a source terminal coupled to a power source, a gate terminal, and the drain terminal, and directly outputting a voltage to the gate terminal of the switch circuit to transition the switch circuit from a closed state to an open state when the voltage at the drain terminal of the switch circuit is less than a predetermined voltage threshold.

In another example, aspects of this disclosure are directed to a medical device comprising means for monitoring a voltage at a drain terminal of a switch circuit, wherein the switch circuit comprises a source terminal coupled to a power source, a gate terminal, and the drain terminal, and means for directly outputting a voltage to the gate terminal of the switch circuit to transition the switch circuit from a closed state to an open state when the voltage at the drain terminal of the switch circuit is less than a predetermined voltage threshold.

In another example, aspects of this disclosure are directed to a computer-readable storage medium comprising instructions that cause one or processors, in a medical device, to monitor a voltage at a drain terminal of a switch circuit, wherein the switch circuit comprises a source terminal coupled to a power source, a gate terminal, and the drain terminal, and directly output a voltage to the gate terminal of the switch circuit to transition the switch circuit from a closed state to an open state when the voltage at the drain terminal of the switch circuit is less than a predetermined voltage threshold.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
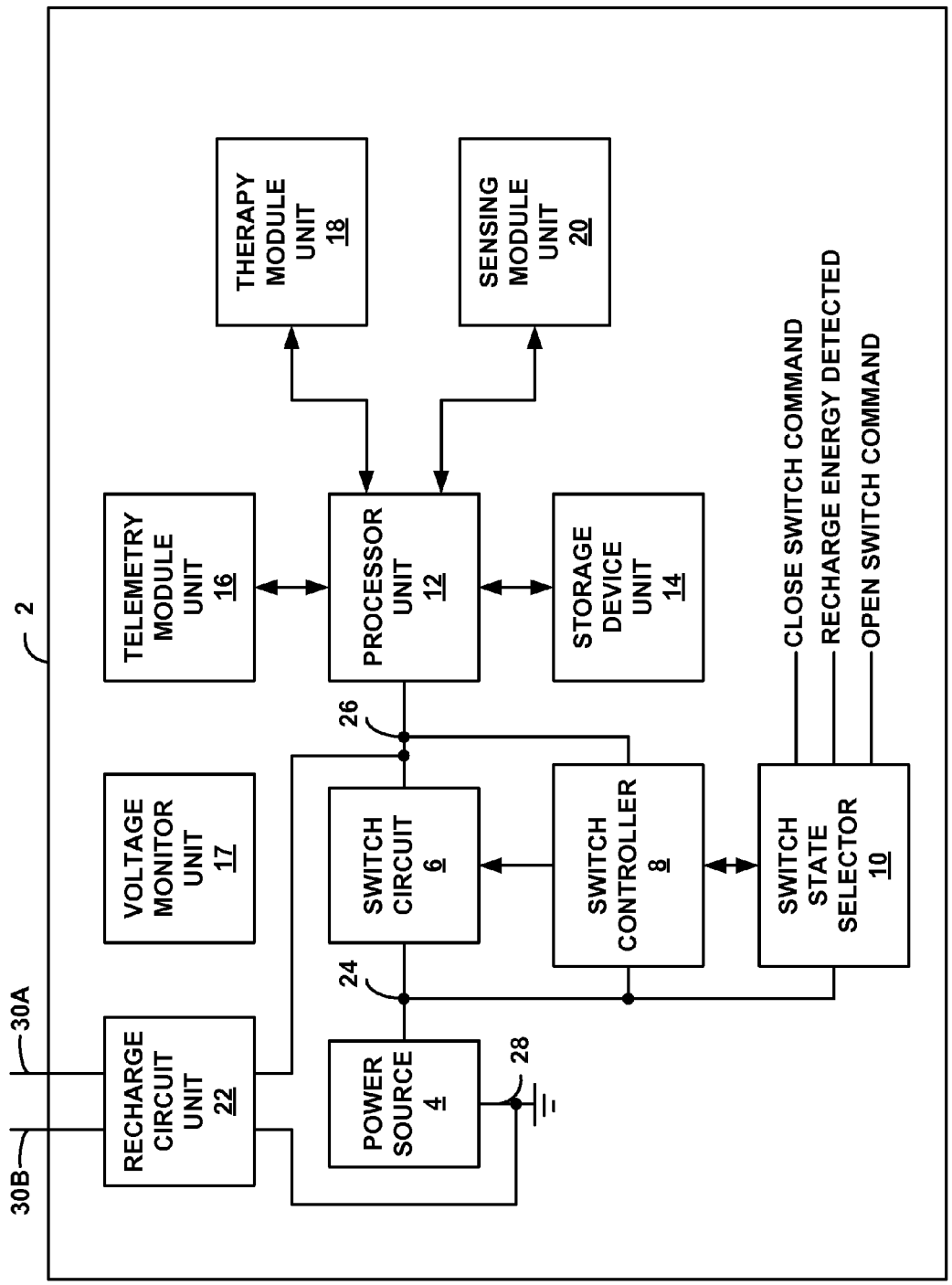
FIG. 1 is a block diagram illustrating an example device that may be configured in accordance with aspects of this disclosure.

Various aspects of this disclosure relate to coupling and decoupling a power source from some of the circuitry within an electronic device such as a medical device. The power source may be battery or a plurality of batteries coupled together to form the power source. The power source may deliver power to the circuitry within the device. Due to the delivery of power, the power source may drain.

When the device is a non-operational state, e.g., when the device is not being used, some of the circuitry within the device may be configured for a low power mode. Even in the low power mode, the circuitry may receive some low amount of power from the power source. Although the amount of power is relatively low, the power source may still drain, particularly over an extended period of time. This current drain when the device is non-operational may fully drain the power source before it is ever placed in an operational state.

As an illustration, upon manufacture, a medical device may not be immediately placed in service. Rather, the medical device may remain in a non-operative state for period of weeks or months. For an implantable medical device, the time between manufacture and implantation may be sufficient to permit reduction in the charge level of a power source.

Also, when a device is in an operational state, e.g., when the device is being used, or when the device is in a non-operational state, a short may develop across some of the circuitry in the device. The short may be an unintended current path from a power node of the power source to a ground node of the power source. In some instances, the short may create a low impedance current path from the power node of the power source to the ground node of the power source. The short may cause the power source to drain relatively quickly because the amount of current delivered by the power source may be relatively high.

To reduce the likelihood of the power source draining, aspects of this disclosure describe techniques to decouple the power source from some of the circuitry in a device when it may be desirable for the power source to not deliver power to the circuitry. In instances when it may be desirable for the power source to deliver power to the circuitry, aspects of this disclosure describe techniques to couple the power source to the circuitry.

In examples of this disclosure, a switch circuit may decouple the power source from at least some of the circuitry in the device and couple the power source to the at least some of the circuitry. When the power source is decoupled from the circuitry, the circuitry may not receive power from the power source. When the power source is coupled to the circuitry, the circuitry may receive power from the power source.

In aspects of this disclosure, the switch circuit may receive power from the power node of the power source. When the switch circuit is in a closed state, the switch circuit may couple the power source to the circuitry within the device. When the switch circuit is in an open state, the switch circuit may decouple the power source from the circuitry within the device.

The switch circuit may be directly coupled to a switch controller. The switch controller may cause the switch circuit to be in either the open state or the closed state, on a selective basis. For example, when the device is not being utilized, e.g., in a non-operational state, the switch controller may cause the switch circuit to be in an opened state. When the device is utilized, the switch controller may cause the switch circuit to be in a closed state.

In some examples of this disclosure, the switch controller may monitor the output voltage of the switch circuit. If the output voltage of the switch circuit drops below a threshold, the switch controller may transition the switch circuit from the closed state to the open state. The drop in the output voltage of the switch circuit may be caused by a short that developed within the circuitry.

Furthermore, in some examples of this disclosure, a switch state selector may transmit commands to the switch controller that define the state of the switch circuit, as described in more detail. Based on the commands, the switch controller may cause the switch circuit to be in the commanded state. As one example, when the power source is being recharged, the switch state selector may transmit a command to the switch controller to cause the switch circuit to be in the closed state. As another example, if the current delivered by the power source is greater than a threshold, the switch state selector may transmit a command to the switch controller to cause the switch circuit to be in the open state.

FIG. 1 is a block diagram illustrating an example device 2 that may be configured in accordance with aspects of this disclosure. Examples of device 2 include devices that are powered by a battery or batteries such as, but not limited to, a medical device such as an implantable medical device (IMD). Other examples of device 2 may include a laptop computer, a mobile phone, a gaming console, and the like. Aspects of this disclosure are described in the context of device 2 being an IMD, but this disclosure should not be limited to IMDs. Aspects of this disclosure may be utilized in other medical devices including external medical devices that may provide therapy and/or sense one or more physiological conditions, as well as, external programmers that are configured to program and/or monitor other medical devices. Furthermore, in some examples, aspects of this disclosure may be utilized in devices other than medical devices.

Device 2 may include power source 4, switch circuit 6, switch controller 8, switch state selector 10, processor unit 12, storage device unit 14, telemetry module unit 16, voltage monitor unit 17, and recharge circuit unit 22. As described in more detail below, all of the circuits and modules may not be necessary in every example of device 2. For instance, in some examples, device 2 may not include switch state selector 10, voltage monitor unit 17, and recharge circuit unit 22. Furthermore, although shown as separate units in FIG. 1, in some examples, switch circuit 6, switch controller 8, and switch state selector 10 may be formed in a single circuit. Also, although shown as separate units in FIG. 1, in some examples, voltage monitor unit 17 and recharge circuit unit 22 may be incorporated as a part of processor unit 12.

In some examples of device 2, switch controller 8 and switch state selector 10 may be configured as hardware units. In some examples of device 2, switch controller 8 and switch state selector 10 may be formed within the same hardware unit. In some examples of device 2, switch controller 8 and switch state selector 10 may be configured partially as hardware and software that is executing on the hardware.

Device 2 may also include additional components not shown for purposes of clarity. For example, device 2 may include a display and a user interface in examples where device 2 is a laptop computer, mobile phone, gaming console, and the like. As another example, device 2 may include a microphone and speaker to effectuate telephonic communication in examples where device 2 is a mobile phone. Various other components may be formed within device 2 based on the functionality of device 2. Aspects of this disclosure should not be considered limited to the example additional components described above.

Device 2 may include sensing module unit 20 to sense physiological signals or other parameters associated with a patient, and/or therapy module unit 18 to deliver therapy to a patient. Therapy module unit 18 and sensing module unit 20 are shown for illustration purposes and may not be required in every example of device 2. For example, in instances where device 2 is not configured to deliver therapy or sense patient signals, device 2 may not include sensing module unit 20 and therapy module unit 18. Furthermore, in some examples, device 2 may include therapy module unit 18, but may not include sensing module unit 20. In some examples, device 2 may include sensing module unit 20, but may not include therapy module unit 18.

In some examples of device 2 that include therapy module unit 18 and sensing module unit 20, therapy module unit 18 may be coupled to one or more electrodes. In some cases, some of the electrodes may be carried on one or more leads. Therapy module unit 18 may be configured to provide electrical stimulation therapy to a patient to address at least one physiological condition experienced by the patient. In some examples, therapy module unit 18 may be a drug delivery device configured to provide medication to a patient in accordance with a drug delivery schedule, e.g., via a pump coupled to one or more fluid delivery catheters. In some examples, sensing module unit 20 may be coupled to the same electrodes as therapy module unit 18 to sense physiological signals or other parameters associated with the patient. In some examples, sensing module unit 20 may be coupled to electrodes designated for sensing purposes that are different than the electrodes coupled to therapy module unit 18. In some examples, instead of or in addition to being coupled to electrodes, sensing module unit 20 may be coupled to different types of sensors to sense physiological signals or parameters associated with the patient. For example, sensing module unit 20 may be coupled to pressure sensors, blood flow sensors, respiration sensors, and the like. It should be noted that aspects of this disclosure are not limited to the example functions of therapy module unit 18 and sensing module unit 20 described above. An example of device 2 configured as an IMD is shown in more detail with respect to FIG. 7.

Power source 4 may be any unit that provides power to the components of device 2 by discharging charge that is stored on power source 4. Power source 4 may be a single battery or multiple batteries that are tied together in parallel or in series to form a single power source. The battery or batteries may be rechargeable or non-rechargeable, e.g., primary cell batteries. Examples of power source 4 include, but are not limited to, lead acid batteries, nickel cadmium (NiCad) batteries, nickel metal hydride (NiMH) batteries, lithium ion (Li-ion) batteries, and lithium ion polymer (Li-ion polymer) batteries.

Also, power source 4 may be one or more capacitors or super capacitors tied together in parallel or in series to form a single power source. For purposes of illustration, aspects of this disclosure are described in the context of power source 4 being one or more batteries. However, aspects of this disclosure are not so limited.

Power source 4 includes power node 24 and ground node 28. As illustrated in FIG. 1, power source 4 may be directly coupled to some of the circuitry in device 2. For example, power source 4 may be directly coupled to switch circuit 6, switch controller 8, and switch state selector 10, in examples that include switch state selector 10. In the example of FIG. 1, power source 4 may directly deliver power to switch circuit 6, switch controller 8, and switch state selector 10, in examples of device 2 that include switch state selector 10.

Switch circuit 6 may receive power from power source 4, via power node 24, and may output power, via power node 26. Switch circuit 6 may provide power to one or more units within device 2. For example, processor unit 12, storage device unit 14, telemetry module unit 16, voltage monitor unit 17, therapy module unit 18, sensing module unit 20, and recharge circuit unit 22 may each be coupled to power node 26. Although not shown in FIG. 1, processor unit 12, storage device unit 14, telemetry module unit 16, voltage monitor unit 17, therapy module unit 18, sensing module unit 20, and recharge circuit unit 22 may each also be coupled to ground node 28. For purposes of clarity, processor unit 12, storage device unit 14, telemetry module unit 16, voltage monitor unit 17, therapy module unit 18, sensing module unit 20, and recharge circuit unit 22 may be referred to as one or more units. Moreover, the one or more units may also include components not shown in FIG. 1, in addition to the example list of the one or more units provided above.

In one example, switch circuit 6 may include a transistor, such as a positive channel field effect transistor (PFET). In other examples, switch circuit 6 may include other examples of transistors. One example of a PFET is the Vishay SIA511P. Switch circuit 6 may comprise three terminals: a source terminal, a drain terminal, and a gate terminal. The source terminal of the PFET may be coupled to power node 24. The drain terminal of the PFET may be coupled to power node 26 and directly coupled to switch controller 8. The gate terminal of the PFET may be directly coupled to switch controller 8. Switch controller 8 may be receive power directly from power node 24 coupled to power source 4.

To place switch circuit 6 in a closed state, switch controller 8 may output a voltage to switch circuit 6 at a first voltage level. For instance, in examples where switch circuit 6 is a PFET, switch controller 8 may output a voltage to the gate terminal of the PFET at a voltage level substantially similar to the voltage level of ground node 28. In this manner, switch controller 8 may place switch circuit 6 in the closed state.

In the closed state, switch circuit 6 may allow current to flow from power node 24 to power node 26. As described above, processor unit 12, storage device unit 14, telemetry module unit 16, voltage monitor unit 17, therapy module unit 18, sensing module unit 20, and recharge circuit unit 22 may each be coupled to power node 26. Accordingly, in the closed state, switch circuit 6 may couple power source 4 to the one or more units, e.g., processor unit 12, storage device unit 14, telemetry module unit 16, voltage monitor unit 17, therapy module unit 18, sensing module 20, and recharge circuit unit 22.

To place switch circuit 6 in an open state, switch controller 8 may output a voltage to switch circuit 6 at a second voltage level. For instance, in examples where switch circuit 6 is a PFET, switch controller 8 may output a voltage level to the gate terminal of the PFET at a voltage level substantially similar to the voltage level of power node 24. In this manner, switch controller 8 may place switch circuit 6 in the open state.

In the open state, switch circuit 6 may not allow current to flow from power node 24 to power node 26. Accordingly, in the open state, switch circuit 6 may decouple power source 4 from the one or more units. As described above, examples of the one or more units include processor unit 12, storage device unit 14, telemetry module unit 16, voltage monitor unit 17, therapy module unit 18, sensing module unit 20, and recharge circuit unit 22.

Within device 2, it may be possible for a short to develop. In some instances, the short may develop within the one or more of the units. However, aspects of this disclosure are not so limited. A short may be an unintended current path from power node 26 to ground node 28. For instance, a short may be a low impedance current path from power node 26 to ground node 28. The short may be in order of milliohms or a few ohms in impedance, but aspects of this disclosure are not so limited.

As one example, it may be possible for a connection on storage device unit 14 to power node 26 to accidentally shift and make contact with ground node 28. The shift may create a low impedance path from power node 26 to ground node 28. As another example, a connection on processor unit 12 to power node 26 may accidentally be bent and make contact with ground node 28. The contact between power node 26 and ground node 28 may create a low impedance path from power node 26 to ground node 28. There may be other ways in which a short may be developed from power node 26 to ground node 28, and aspects of this disclosure are not limited to the examples provided above.

When a short develops, power source 4 may drain a relatively high amount of current because the impedance path from power node 26 to ground node 28 is relatively low. For example, assume the voltage of power source 4 is three volts (V) with an ideal zero ohm source impedance, the impedance of the short is one ohm, and switch circuit 6 is a closed state. In this example, the amount of current delivered by power source 4 is three amps, i.e., 3V divided by 1 ohm.

Delivery of high amounts of current may cause power source 4 to drain quickly. The quick drain of power source 4 may reduce the operational time of power source 4. Furthermore, delivery of high amounts of current may cause thermal excursion. Delivery of high amounts of current may cause delivery of high amounts of power. Thermal excursion may be the heating of power source 4 or other components due to the delivery of high amounts of power. For instance, when power source 4 delivers three amps, power source 4 may be delivering approximately nine watts of power, i.e., 3 amps multiplied by 3V. Delivery of nine watts may cause heating. In examples where device 2 is implanted within the patient, the heating caused by thermal excursion may have possible unintended effects on the patient.

When a short develops in device 2, such as in the one or more units within device 2, the voltage level of power node 26 may reduce due to the low impedance between power node 26 and ground node 28. Due to the low impedance from power node 26 to ground node 28, the voltage level of power node 26 may be substantially the same as the voltage level of ground node 28, e.g., 0V.

To reduce the amount of current delivered by power source 4, switch controller 8 may be configured to monitor the voltage of power node 26. If the voltage of power node 26 reduces below a predetermined voltage threshold, switch controller 8 may transition switch circuit 6 from the closed state in which power is provided to the one or more units of device 2 to the open state in which power is not provided to one or more units of device 2. For example, switch controller 8 may output a voltage level that is approximately the same voltage level of power node 24 to the gate terminal of the PFET of switch circuit 6. The voltage level of power node 24 to the gate terminal of the PFET may cause the PFET to assume an open state.

As one example, the predetermined voltage threshold may be 1V. However, aspects of this disclosure are not so limited. The predetermined voltage threshold may be greater than or less than 1V.

As described above, when switch circuit 6 is in an open state, switch circuit 6 may not allow power source 4 to provide power to the one or more units. In this manner, switch circuit 6 may decouple power source 4 from the one or more units when the voltage at power node 26 reduces below the predetermined voltage threshold. The reduction in the voltage at power node 26 may be caused by the developed short. When decoupled from the one or more units, power source 4 may not deliver high amounts of current and may not power the one or more units. By decoupling power source 4 from the one or more units when the voltage at power node 26 reduces below the predetermined voltage threshold, aspects of this disclosure may extend the operation time of power source 4 and reduce the possibility of thermal excursion.

In some examples, switch circuit 6 may provide some current limiting capabilities when a short develops in device 2. The PFET, of switch circuit 6, may act to limit current even before switch circuit 6 transitions to the open state after the short develops in device 2.

The current limiting capabilities of the PFET may be based on the impedance of the PFET. The impedance of the PFET may be based on the difference between the voltage at the source terminal and the voltage at the gate terminal of the PFET. The voltage at the source terminal of the PFET, of switch circuit 6, may be referred to as the source voltage. The voltage at the gate terminal of the PFET, of switch circuit 6, may be referred to as the gate voltage.

In general, a relatively large difference between the source voltage and the gate voltage, e.g., source voltage minus gate voltage, results in a low impedance path through the PFET. A relatively small difference between the source voltage and the gate voltage, e.g., source voltage minus gate voltage, results in a high impedance path through the PFET. For example, in the closed state, the source voltage may be substantially the same as the voltage of power node 24, and the gate voltage may be substantially the same as the voltage of ground node 28. In this instance, the difference between the source voltage and the gate voltage may be relatively large, and the impedance of the PFET, of switch circuit 6, may be relatively small.

As described above, when a short develops in device 2, the voltage at power node 26 may drop. When switch circuit 6 is in the closed state, the drop in voltage at power node 26 may cause a drop in voltage at power node 24. A drop in voltage at power node 24 may cause a drop in the source voltage. The drop in the source voltage may reduce the difference between the source voltage and the gate voltage of the PFET, of switch circuit 6. The reduction in the difference between the source voltage and the gate voltage may increase the impedance of the PFET. The increase in the impedance of the PFET may reduce the amount of current delivered by power source 4. In this manner, even before switch circuit 6 transitions to an open state when a short develops in device 2, the PFET, of switch circuit 6, may provide some current limiting capabilities.

In the above examples, switch controller 8 may cause switch circuit 6 to transition to an opened state when the voltage level of power node 26 reduces below a predetermined voltage threshold, and switch circuit 6 may provide some current limiting capabilities. The above example may be sufficient for low capacity power sources to extend the operational time of power source 4. For example, for power sources with capacities of less than or equal to approximately 20 milliamp-hours (mA-Hr), the above examples may be sufficient to extend the operation time of power source 4 and reduce the possibility of thermal excursion. For instance, for power sources with less than or equal to 20 mA-Hr of capacity, when a short develops in device 2, such power sources may discharge fully prior to any significant thermal excursion.

However, for power sources with greater capacities, such as power sources with capacities of approximately 100 mA-Hr or 300 mA-Hr, incorporation of additional current limiting circuitry may be preferable to further reduce the possibility of thermal excursion. In some of these examples, device 2 may further include switch state selector 10.

In some examples, although aspects of this disclosure are not so limited, switch state selector 10 may include current limiting circuitry that causes switch circuit 6 to transition from the closed state to the open state, when the current delivered by power source 4 is greater than a predetermined current threshold. The current limiting circuitry may include a sense resistor coupled to a current comparator. A current through the sense resistor causes a voltage drop across the sense resistor. The current comparator may be configured to sense the voltage across the sense resistor. If the voltage across the sense resistor is greater than a predetermined threshold, the current comparator may instruct switch controller 8 to transition switch circuit 6 from the closed state to the open state. In response to the instruction, switch controller 8 may transition switch circuit 6 from the closed state to the open state. In this manner, switch state selector 10 may cause switch circuit 6 to transition from a closed state to an open state, when the current delivered by power source 4 is greater than a predetermined current threshold.

Accordingly, switch state selector 10 may provide current limiting circuitry because power source 4 may not be able to deliver current above a predetermined current threshold. The predetermined current threshold may be approximately 300 mA. However, aspects of this disclosure are not so limited. The predetermined current threshold may be greater than or less than 300 mA. The current limiting circuitry may further extend the operation time of power source 4 and may further reduce the possibility of thermal excursion.

As described above, switch circuit 6 may transition from a closed state to an open state when the voltage at power node 26 reduces below a predetermined voltage threshold and/or when the current delivered by power source 4 is greater than a predetermined current threshold. However, there may be other reasons to transition switch circuit 6 from the closed state to the open state.

In some instances, it may preferable to not allow power source 4 to fully discharge. Fully discharging power source 4 may be referred to as a 0V strike. Also, it may be possible for the capacity of power source 4 to reduce to a level that is insufficient to deliver stimulation therapy.

In some examples of this disclosure, voltage monitor unit 17 may be configured to monitor the voltage of power node 24. Again, power node 24 may be the voltage of power source 4. If the voltage level of power node 24 reduces below or is approximately equal to a predetermined voltage threshold, voltage monitor unit 17 may output an open switch command to switch state selector 10. In response, switch state selector 10 may output a command to switch controller 8 that instructs switch controller 8 to transition switch circuit 6 from the closed state to the open state. In response, switch controller 8 may cause switch circuit 6 to transition from the closed state to the open state.

In this manner, voltage monitor unit 17 may ensure that a 0V strike does not occur on power source 4. For example, before power source 4 fully discharges, voltage monitor unit 17 may cause switch circuit 6 to transition from the closed state to the open state, thereby decoupling power source 4 from the one or more units. When power source 4 is decoupled from the one or more units, power source 4 may not discharge as quickly as when power source 4 is coupled to the one or more units, and may not fully discharge. As described above, a full discharge of power source 4 may be a 0V strike.

Similarly, in this manner, voltage monitor unit 17 may decouple power source 4 from the one or more units when the capacity of power source 4 is not sufficient to provide therapy stimulation. For example, when the capacity of power source 4 is not sufficient to provide therapy stimulation, voltage monitor unit 17 may cause switch circuit 6 to transition from the closed state to the open state, thereby decoupling power source 4 from the one or more units. In this manner, therapy module unit 18 may not deliver stimulation therapy at less than programmed voltage levels.

Voltage monitor unit 17 is provided for illustration purposes only. In general, any technique to monitor the voltage and capacity of power source 4 may be utilized. For example, instead of or in addition to voltage monitor unit 17, device 2 may include a coulomb counter. Based on the amount of charge delivered by power source 4, as counted by the coulomb counter, processor unit 12 may determine the capacity of power source 4. If the capacity of power source 4 reduces below a predetermined threshold, processor unit 12 may output an open switch command to switch state selector 10. In response, switch state selector 10 may output a command to switch controller 8 that instructs switch controller 8 to transition switch circuit 6 from the closed state to the open state. In response, switch controller 8 may cause switch circuit 6 to transition from the closed state to the open state.

In some instances, where switch circuit 6 is in the open state, switch circuit 6 may inadvertently transition to the closed state. For example, voltage radiated from an antenna in proximity to switch circuit 6 may inadvertently cause switch circuit 6 to transition from the open state to the closed state.

Processor unit 12 may be configured to determine whether it receives commands, within a certain time range, after switch circuit 6 transitions from the open state to the closed state. If processor unit 12 does not receive any commands within the time range, processor unit 12 may output an open switch command to switch state selector 10, which may then cause switch circuit 6 to transition from the closed state to the open state. In this manner, even if switch circuit 6 is inadvertently transitioned from the open state to the closed state, processor unit 12 may be able to transmit a command that causes switch circuit 6 to transition back to the open state.

The above examples describe some techniques to transition switch circuit 6 from the closed state to the open state to decouple power source 4 from the one or more units. However, in some instances, it may be preferable to ensure that switch circuit 6 is in the closed state.

For example, as illustrated in FIG. 1, recharge circuit unit 22 receives recharge energy via lines 30A and 30B. In some examples, lines 30A and 30B may be terminals of a tank circuit including one or more implanted coils that may receive inductive recharge energy from a recharge coil outside the patient's body for inductive transcutaneous recharge. Recharge circuit unit 22 may provide the recharge energy to the output of switch circuit 6, e.g., the drain terminal of switch circuit 6. When switch circuit 6 is in the closed state, the recharge energy may flow through the drain terminal of switch circuit 6 to the source terminal of switch circuit 6 and into power source 4. When switch circuit 6 is in the open state, the recharge energy may flow through the drain terminal of switch circuit 6 to the source terminal of switch circuit 6, via the parasitic diode between the drain and source terminals of switch circuit 6, and into power source 4. In the open state, the parasitic diode may cause the voltage of the recharge energy to reduce before reaching power source 4. Accordingly, it may be preferable that switch circuit 6 be in the closed state, when recharge energy is detected, to avoid the voltage drop caused by the parasitic diode.

Switch state selector 10 may detect the recharge energy on lines 30A and 30B. When switch state selector 10 detects the recharge energy, switch state selector 10 may transmit a command to switch controller 8 to cause switch circuit 6 to transition to the closed state. Recharge circuit unit 22 may then allow power source 4 to be recharged.

As another example, an antenna in proximity to switch circuit 6 may be utilized to cause switch circuit 6 to transition from the open state to the closed state. As described above, in some instances voltage radiating from the antenna may inadvertently transition switch circuit 6 from the open state to the closed state. However, in some examples, the antenna may be used to purposefully transition switch circuit 6 from the open state to the closed state. For example, a user of device 2 may transition device 2 from the non-operational state to the operational state by radiating voltage from an antenna in proximity to switch circuit 6 to transition switch circuit 6 from the open state to the closed state. As described above, when switch circuit 6 is in the closed state, power source 4 may be coupled to the one or more units.

The above techniques may couple or decouple power source 4 from the one or more units. Decoupling power source 4 may increase the operational time of power source 4 because power source 4 is not delivering power to the one or more units, when decoupled. Decoupling power source 4 may also reduce the possibility of thermal excursion.

However, even when power source 4 is decoupled from the one or more units, power source 4 may still be coupled to switch circuit 6, switch controller 8, and switch state selector 10, in examples of device 2 that include switch state selector 10. Switch circuit 6, switch controller 8, and switch state selector 10 may be configured to consume relatively low amounts of current, especially as compared to the one or more units. For example, the one or more units may be configured to consume current on the order of milliamps. Switch circuit 6, switch controller 8, and switch state selector 10 may be configured to consume current on the order of nano-amps (nA), e.g., less than approximately 100 nA. Accordingly, even when decoupled from the one or more units, power source 4 may still deliver some current to switch circuit 6, switch controller 8, and switch state selector 10. However, the current delivered to switch circuit 6, switch controller 8, and switch state selector 10 may be much less than the current delivered to the one or more units.

The above examples of this disclosure may provide some advantages when device 2 is in an operational state, or when device 2 is in a non-operational state. Furthermore, aspects of this disclosure may provide some additional advantages when device is in the non-operational state.

When device 2 is in a non-operational state, the one or more units may be decoupled from power source 4. For example, in the non-operational state, switch controller 8 may be configured to output a voltage, to the gate terminal switch circuit 6 at a level that is substantially similar to the voltage level of power node 24. In this instance, switch circuit 6 may be in an open state, and may not allow current to flow from power source 4 to the one or more units.

When device 2 is shipped to a location, device 2 may remain at the location before being implanted within a patient. In this situation, switch controller 8 may cause switch circuit 6 to be in the open state. Accordingly, power source 4 may only provide power to switch circuit 6, switch controller 8, and switch state selector 10. In this situation, power source 4 may not deliver power to any of the one or more units.

Because power source 4 may not deliver power to the one or more units in the non-operational state, power source 4 may drain relatively slowly. For example, in the non-operational state, power source 4 may still deliver power to switch circuit 6, switch controller 8, and switch state selector 10. Switch circuit 6, switch controller 8, and switch state selector 10 may be configured to operate with relatively low amounts of current, e.g., less than 100 nA.

By decoupling power source 4 from the one or more units, when device 2 is in the non-operational state, aspects of this disclosure may extend the amount of time before power source 4 fully drains. In some examples, when device 2 is in the non-operational state, the one or more units may be configured for a low power mode. In the low power mode, the one or more units may be configured to consume current on the order of micro-amps. In some examples, utilizing just the low power mode, it may take approximately 12 months for power source 4 to fully drain. However, by decoupling power source 4 from the one or more units, when device 2 is in the non-operational state, it may take approximately 18 months for power source 4 to fully drain. In these examples, it may take approximately 18 months for power source 4 to fully drain because the current consumed by switch circuit 6, switch controller 8, and switch state selector 10 may be substantially less than the current consumed by the one or more units, even when the one or more units are in low power mode.

As illustrated in FIG. 1, device 2 may also include processor unit 12, telemetry module unit 16, and storage device unit 14. Telemetry module unit 16 may comprise circuitry for wired or wireless communication between device 2 and another device or network. Telemetry module unit 16 may include filters, modulators, de-modulators and the like to effectuate wired or wireless communication.

Examples of processor unit 12 include, but are not limited to, a digital signal processor (DSP), general purpose microprocessor, application specific integrated circuit (ASIC), field programmable logic array (FPGA), or other equivalent integrated or discrete logic circuitry. Processor unit 12 may be configured to deliver therapy to the patient via therapy module unit 18. Processor unit 12 may also be configured to receive the sensed signals of the patient via sensing module unit 20.

Storage device unit 14 may comprise a computer-readable storage media. Examples of storage device 12 include, but are not limited to, random access memory (RAM), read only memory (ROM), electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. In some examples, where switch controller 8 and switch state selector 10 are implemented as software executing on hardware, storage device unit 14 may include instructions that cause switch controller 8 and switch state selector 10 to perform the functions ascribed to switch controller 8 and switch state selector 10 in this disclosure.

Storage device unit 14 may, in some examples, be considered as a non-transitory storage medium. The term "non-transitory" may indicate that the storage medium is not embodied in a carrier wave or a propagated signal. However, the term "non-transitory" should not be interpreted to mean that storage device unit 14 is non-movable. As one example, storage device unit 14 may be removed from device 2, and moved to another device. As another example, a storage device, substantially similar to storage device unit 14, may be inserted into device 2. In certain examples, a non-transitory storage medium may store data that can, over time, change (e.g., in RAM).

As described above, aspects of this disclosure may extend the operational time of power source 4 and may reduce the possibility of power source 4 delivering sufficient power to cause possible unintended effects of thermal excursion. In some instances, if the temperature of implanted medical device 2 containing power source 4 is limited to approximately 42 degrees Celsius (C), the patient may not experience unintended thermal excursion effects for thirty minutes. For every one degree drop in temperature below 42 degrees C., the duration before the patient may experience the unintended effects increases by a factor of four. Accordingly, by reducing the possibility of thermal excursion, the duration of time before the patient may experience any possible unintended effects from thermal excursion may be increased dramatically.

Aspects of this disclosure may also provide other advantages. As one example, the size of switch circuit 6, switch controller 8, and switch state selector 10 may be smaller than the size of components used in conventional devices, e.g., a 20 ohm resistor in series with the power source, to reduce thermal excursion. In some conventional devices, the 20 ohm resistor reduced the amount of current delivered by the power source. The reduction in the amount of current delivered by the power source reduced thermal excursion. As another example, components to reduce thermal excursion in conventional devices may reduce the rate at which the power source is recharged. Aspects of this disclosure may allow power source 4 to be recharged more quickly compared to in conventional devices. As yet another example, components to reduce thermal excursion, in conventional devices, may limit the performance of device 2, when device 2 outputs high-amplitude stimulation signals. For example, the 20 ohm resistor in series with the power source creates a voltage drop, in conventional devices. The voltage drop reduces the amplitude of the stimulation signal, or requires additional voltage to compensate for the voltage drop. Aspects of this disclosure may allow power source 4 to source the voltage needed for the high-amplitude stimulation signals without the voltage drop.

Figure 2:
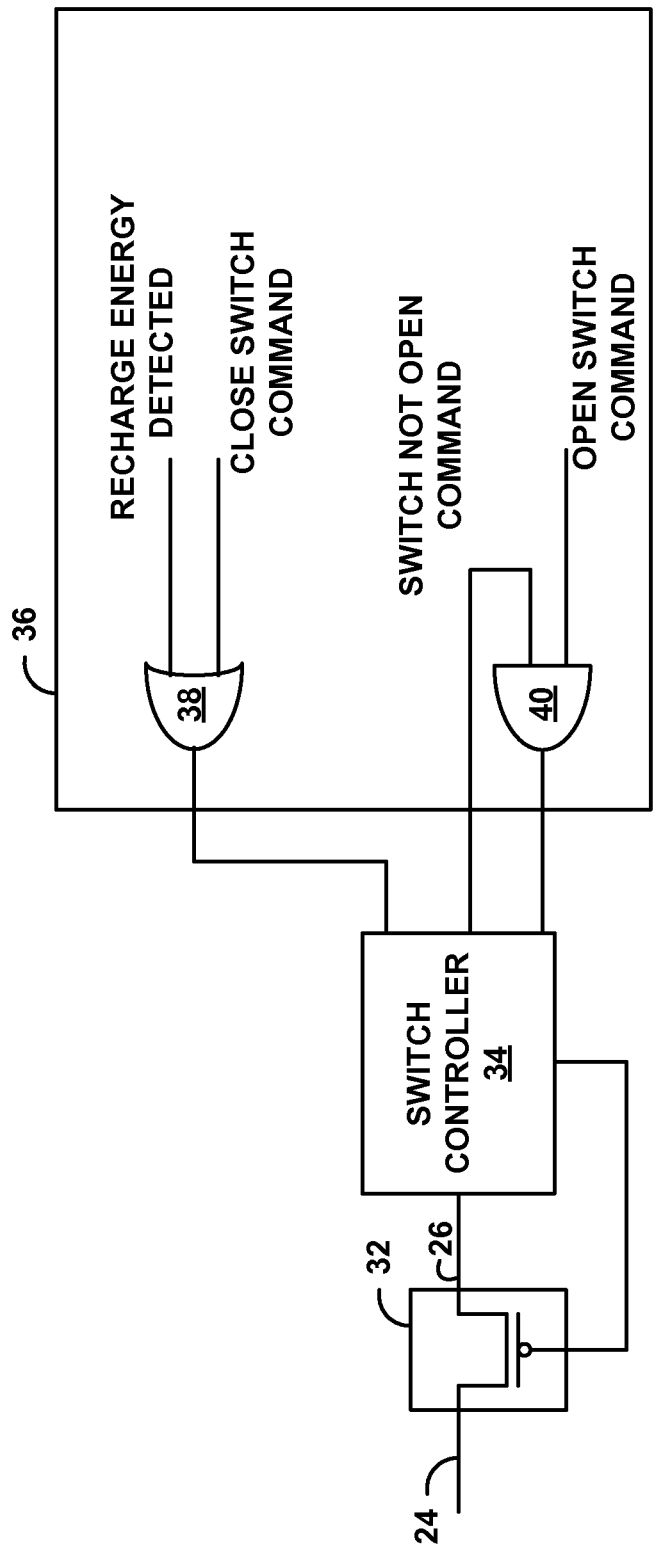
FIG. 2 is a block diagram illustrating an example of a switch circuit, switch controller, and switch state selector of FIG. 1 in further detail.

FIG. 2 is a block diagram illustrating an example switch circuit 32, switch controller 34, and switch state selector 36. Switch circuit 32 may be one example of switch circuit 6 (FIG. 1). Switch controller 34 may be one example of switch controller 8 (FIG. 1). Switch state selector 36 may be one example of switch state selector 10 (FIG. 1). As illustrated in FIG. 2, switch circuit 32 may be a PFET. The PFET may comprise a source terminal, a drain terminal, and a gate terminal. The source terminal may be coupled to power node 24 (FIG. 1) and the drain terminal may be coupled to power node 26 (FIG. 1). The gate terminal may be coupled directly to switch controller 34.

As described above, switch controller 34 may monitor the voltage level at power node 26. Power node 26 may be the drain terminal of the PFET within switch circuit 32. If the voltage at power node 26 drops below a predetermined threshold, e.g., possibly due to a short in the one or more units, switch controller 34 may output a logic one to the gate of the PFET within switch circuit 32. Switch circuit 32 may then transition to the open state to decouple power source 4 from the one or more units. The voltage level of the logic one may be substantially the same as the voltage level of power node 24.

As described in more detail below, switch controller 34 may receive a command to transition the PFET from the open state to the closed state, in some instances. To transition the PFET from the open state to the closed stated, switch controller 34 may output a logic zero to the gate of the PFET. The voltage level of the logic zero may be substantially the same as the voltage level of ground node 28.

In some non-limiting examples, there may be additional reasons to transition the PFET within switch circuit 32 from the closed state to the open state, or vice versa. For example, when the PFET within switch circuit 32 inadvertently transitions from the open state to the closed state, it may preferable to transition the PFET back to the open state. As another example, when the voltage level of power source 4 drops below a predetermined threshold, it may be preferable to transition the PFET to the open state. As another example, when recharge energy is detected, it may be preferable that the PFET is in the closed state.

In some examples, switch state selector 36 may output commands to switch controller 34 that instruct switch controller 34 to transition the PFET from the closed state to the opened state, or vice versa. Switch state selector 36 may include AND gate 40 and OR gate 38. OR gate 38 may be configured to detect recharge energy and receive a close switch command. As one example, OR gate 38 may receive the recharge energy from lines 30A and 30B through a rectifier. As another example, the close switch command may be provided by an external antenna that is radiating power.

The detected recharge energy condition and the close switch command may both be logic one. The voltage of the logic one may be substantially similar to the voltage level of power node 26. If OR gate 38 receives a logic one from either the detected recharge energy, via the rectifier, or the close switch command, OR gate 38 may output a command to switch controller 34. The command to switch controller 34 may instruct switch controller 34 to transition the PFET of switch circuit 32 from the open state to the closed state. The command from OR gate 38 may be a logic one, and the voltage level of the logic one may be substantially similar to the voltage level of power node 24.

AND gate 40 may be configured to receive an open switch command and a switch not open command. Processor 12 may output an open switch command to AND gate 40. For example, firmware executing on processor 12 may output the open switch command to AND gate 40. As yet another example, voltage monitor unit 17 may determine that the voltage or capacity of power source 4 is too low, and may generate the open switch command in response to the determination. The open switch command may be a logic one, and the voltage level of the logic one may be substantially similar to the voltage level of power node 26. As one example, the PFET of switch circuit 32 may inadvertently transition from the open state to the closed state. If processor 12 is not programmed within a certain time range after the PFET transitions from the open state to the closed state, processor 12 may output the logic one to AND gate 40 to transition the PFET back to the open state.

Switch controller 34 may be configured to transmit the switch not open command, in some examples. If the PFET of switch circuit 32 is in the open state, switch controller 34 may transmit a logic zero to AND gate 40. The voltage level of the logic zero may be substantially similar to the voltage of ground node 28. If the PFET of switch circuit 32 is in the closed state, switch controller 34 may transmit a logic one to AND gate 40. The voltage level of the logic one may be substantially similar to the voltage level of power node 26.

Switch controller 34 may be configured to transmit the switch not open command to ensure that if switch circuit 32 is already in the open state, switch state selector 36 does not instruct switch controller 34 to transition switch circuit 32 to an open state. For example, if switch circuit 32 is already in the open state, even if AND gate 40 receives an open switch command, AND gate 40 may not output a command that instructs switch controller 34 to cause switch circuit 32 to transition to the open state because switch circuit 32 is already in the open state.

If AND gate 40 receives a logic one from both the switch not open command and the open switch command, AND gate 40 may output a command to switch controller 34. The command to switch controller 34 may instruct switch controller 34 to transition the PFET of switch circuit 32 from the closed state to the open state. The command from AND gate 40 may be a logic one, and the voltage level of the logic one may be substantially similar to the voltage level of power node 24.

The switch not open command may not be necessary in every example. In examples where switch controller 34 does not transmit the switch not open command, AND gate 40 may not be necessary. In these examples, the open switch command may be coupled to switch controller 34 and may instruct switch controller 34 to cause switch circuit 32 to transition from the closed state to the open state.

Figure 3:
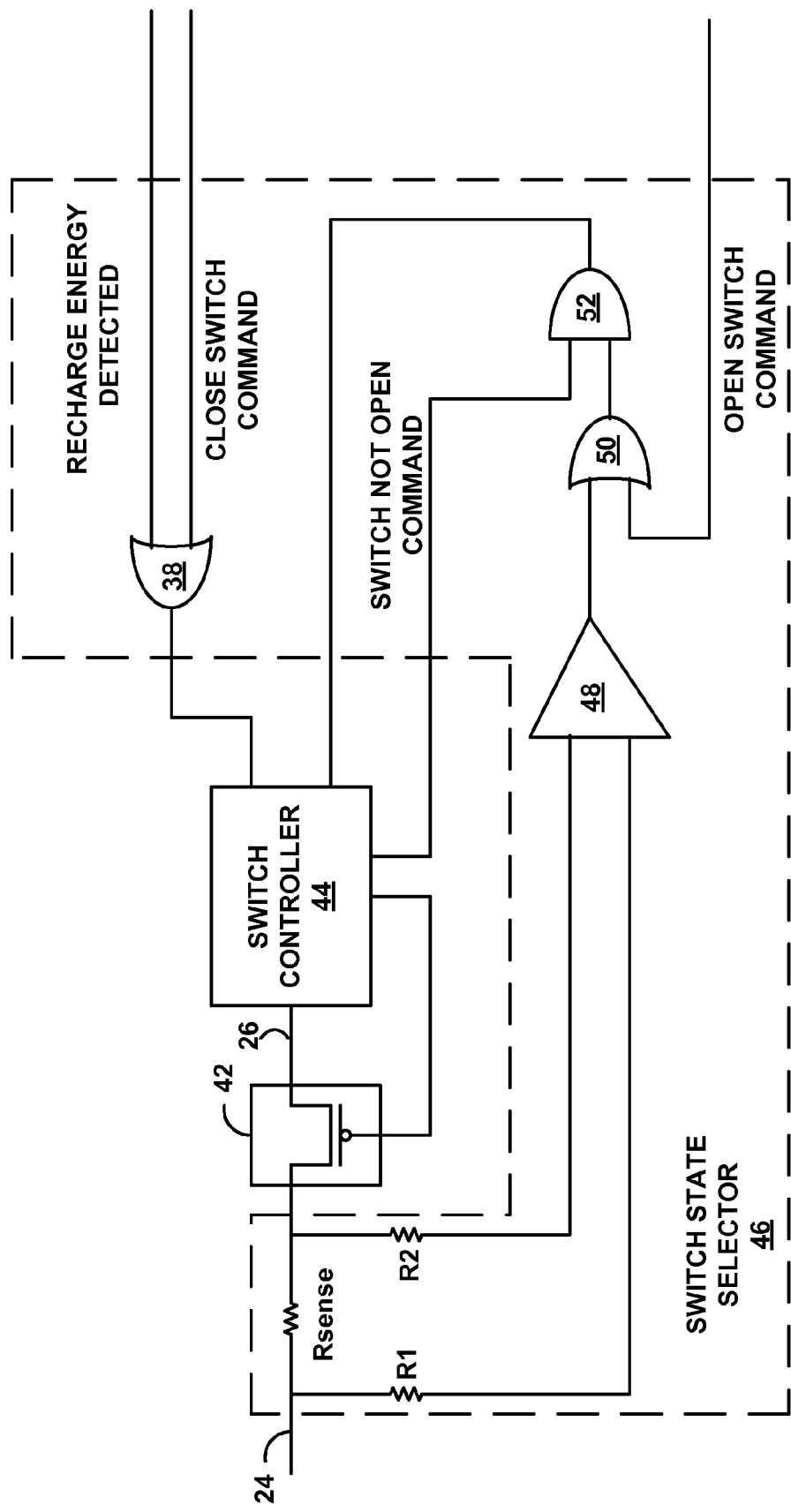
FIG. 3 is a block diagram illustrating another example of a switch circuit, switch controller, and switch state selector of FIG. 1 in further detail.

FIG. 3 is a block diagram illustrating an example switch circuit 42, switch controller 44, and switch state selector 46. Switch circuit 42 and switch controller 44 may be substantially similar to switch circuit 32 (FIG. 2) and switch controller 34 (FIG. 2), and may perform substantially similar features. For purposes of clarity, switch state selector 46 is shown in dashed lines. Switch state selector 46 may be one example of switch state selector 10 (FIG. 1).

As illustrated in FIG. 3, switch state selector 46 includes resistors Rsense, R1, and R2, current comparator 48, OR gate 50, AND gate 52, and OR gate 38. OR gate 38 may be substantially similar to OR gate 38 of FIG. 2 and may perform substantially similar features.

The Rsense resistor may be a sense resistor. A first node of Rsense may be coupled to power node 24 and a second node of Rsense may be coupled to the source terminal of switch controller 42. In some examples, Rsense may provide a relatively low amount of impedance so that the voltage level at the source of the PFET of switch circuit 42 is substantially the same as the voltage level at power node 24. Rsense may be approximately 62 milliohms, although Rsense may be greater than or less than 62 milliohms. The physical size of Rsense may be relatively small. For example, Rsense may be an 0402 sized resistor. The dimensions of an 0402 resistor may be approximately 4 millimeters (mm) in length by 2 mm in width. In one example, R1 and R2 may each be approximately 165 ohms, although R1 and R2 may be greater than or less than 165 ohms. R1 and R2 may also be 0402 sized resistors, as one non-limiting example. R1 and R2 may not be necessary in every example of switch state selector 46.

If the current through Rsense is greater than or equal to a predetermined current threshold, current comparator 48 may instruct switch controller 44 to transition the PFET of switch circuit 42 from the closed state to the open state. The transition from the closed state to the open state may decouple power source 4 from the one or more units. Current comparator 48, Rsense, R1, and R2 may combine to form current limiting circuitry. Current comparator 48 may be configured to measure the voltage across Rsense. The voltage across Rsense may be the voltage across the first and second nodes of Rsense. When current flows through Rsense, the current generates a voltage drop across Rsense. Current comparator 48 may monitor the voltage drop across Rsense. As described in more detail below, if the voltage is greater than an offset within current comparator 48, current comparator 48 may instruct switch controller 44 to transition the PFET of switch circuit 42 from the closed state to the open state.

The offset may be configured during the manufacturing of current comparator 48. The offset may be in series with one of the terminals of current comparator 48. The offset may be selected based on the desired limit for the amount of current that power source 4 can deliver. The current limit of power source 4 may be the predetermined current threshold. For example, assume that it is preferable to not allow power source 4 to deliver more than 300 mA of current, and that Rsense is approximately 62 milliohms. In this example, the predetermined current threshold is 300 mA. When power source 4 delivers 300 mA of current, the voltage drop across Rsense may be approximately 18.6 mV, e.g., 300 mA multiplied by 62 milliohms. Current comparator 48 may be configured with an offset of 18.6 mV. When the voltage drop across Rsense is approximately equal to or greater than the offset, in aspects of this disclosure, current comparator 48 may instruct switch controller 44 to transition the PFET of switch circuit 42 from the closed state to the open state.

The predetermined current threshold may be based on the resistance of Rsense and the offset of current comparator 48. As one example, if the desired current threshold is 200 mA, and the offset of current comparator 48 is configured for 20 mV, then to limit the current to 200 mA, Rsense may be approximately 100 milliohms, e.g., 20 mV divided by 200 mA. As another example, if the desired current threshold is 200 mA, and Rsense is 50 milliohms, then to limit the current to 200 mA, the offset of current comparator 48 may be configured for 10 mV, e.g., 200 mA multiplied by 50 milliohms.

Accordingly, in some examples, switch state selector 46 may monitor the current delivered by power source 4. If the current delivered by power source 4 is greater than a predetermined current threshold, current comparator 48 of switch state selector 46 may output a logic one to OR gate 50. The voltage level of the logic one may be substantially the same as the voltage level of power node 24.

If OR gate 50 receives a logic one from current comparator 48, or receives a logic one from the open switch command, as described above, OR gate 50 may output a logic one to AND gate 52. The voltage level of the logic one may be substantially the same as the voltage level of power node 24. When AND gate 52 receives both a logic one from OR gate 50 and the switch not open command, as described above, AND gate 52 may output a command to switch controller 44. The command to switch controller 44 may instruct switch controller 44 to transition the PFET of switch circuit 42 from the closed state to the open state. In some examples, the command from AND gate 52 may be a logic one, and the voltage level of the logic one may be substantially similar to the voltage level of power node 24.

In some aspects of this disclosure, the current limiting circuitry of switch state selector 46 may limit the amount of current delivered by power source 4, and may further reduce the possibility of thermal excursion, as compared to the example illustrated in FIG. 2. For instance, when a short develops in device 2, it may be possible for the voltage level at power node 26 to reduce, but not reduce below the predetermined voltage threshold. In these instances, switch controller 44 may not cause the PFET of switch circuit 42 to transition from the closed state to the open state.

However, in these instances, the current delivered by power source 4 may be greater than desired. This may cause power source 4 to drain quickly and cause thermal excursion. In these instances, switch state selector 46 may monitor the current delivered by power source 4. If the current delivered by power source 4 is greater than the predetermined current threshold, switch state selector 46 may cause the PFET of switch circuit 42 to transition from the closed state to the open state. The transition from the closed state to the open state may decouple power source 4 from the one or more units. As described above, decoupling power source 4 from the one or more units may reduce the amount of current delivered by power source 4 and may reduce the possibility of thermal excursion.

Figure 4:
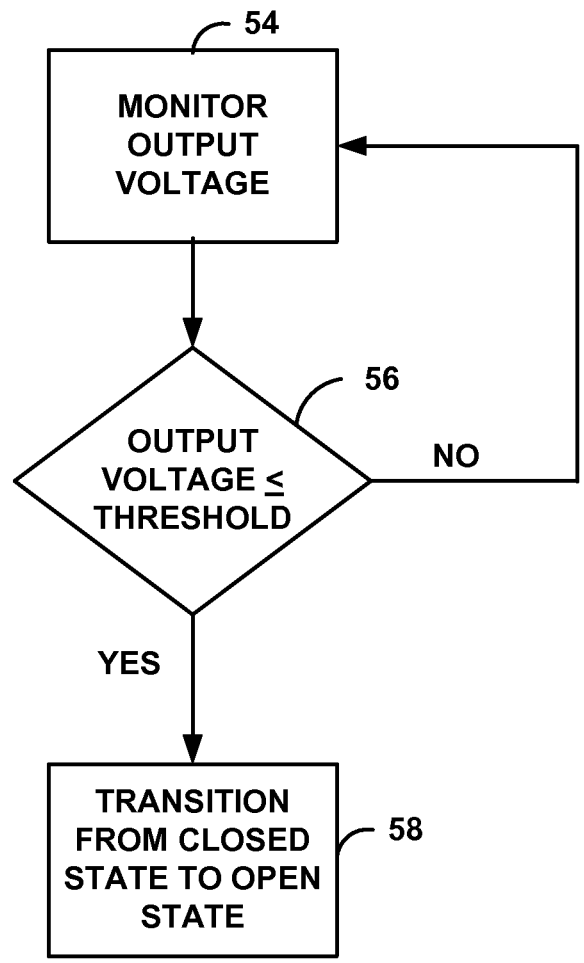
FIG. 4 is a flowchart illustrating an example technique to decouple a power source from one or more units.

FIG. 4 is a flowchart illustrating an example technique to decouple power source 4 from the one or more units. For purposes of illustration, reference is made to FIGS. 1, 2, and 3. Switch controller 8, switch controller 34, and switch controller 44 (collectively referred to as switch controllers) may monitor the output voltage of switch circuit 6, switch circuit 32, and switch circuit 42, respectively, (collectively referred to as switch circuits) (54). As illustrated in FIGS. 1 and 2, the source terminal of switch circuit 6 and switch circuit 32 may be coupled to power source 4. As illustrated in FIG. 3, the source of switch circuit 44 may be coupled to power source 4 via sense resistor Rsense. The drain terminal of the switch circuits may be the output of the switch circuits. Accordingly, the switch controllers may directly monitor the output voltages of the drain terminal of respective switch circuits. As illustrated in FIGS. 1, 2, and 3, the drain of the switch circuits may be coupled to power node 26.

The switch controllers may determine whether output voltage of the respective switch circuits is less than or equal to a predetermined voltage threshold (56). If the output voltage is greater than the predetermined voltage threshold (NO of 56), the switch controllers may maintain the monitoring of the output voltages of respective switch circuits.

If the output voltage is less than or equal to the predetermined voltage threshold (YES of 56), the switch controllers may cause the respective switch circuits to transition from the closed state to the open state (58). For example, if the voltage at power node 26 is less than or equal to the predetermined voltage threshold, switch controller 8, switch controller 34, and switch controller 44 may output a logic one to the gate terminal of switch circuit 6, switch circuit 32, and switch circuit 42, respectively. The voltage level of the logic one may be substantially the same as the voltage level of power node 24. The output of the logic one to the gate terminal of the switch circuits may cause the switch circuits to transition from the closed state to the open state. As described above, when the switch circuits transition from the closed state to the open state, the switch circuits decouple power source 4 from the one or more units, e.g., processor unit 12, storage device unit 14, telemetry module unit 16, voltage monitor unit 17, therapy module unit 18, sensing module unit 20, and recharge circuit unit 22. The foregoing is one example, and the switch circuits may be configured in an alternative example such that application of a logic zero to the gate terminal of the switch circuits may cause the switch circuits to transition from the closed state to the open state.

Figure 5:
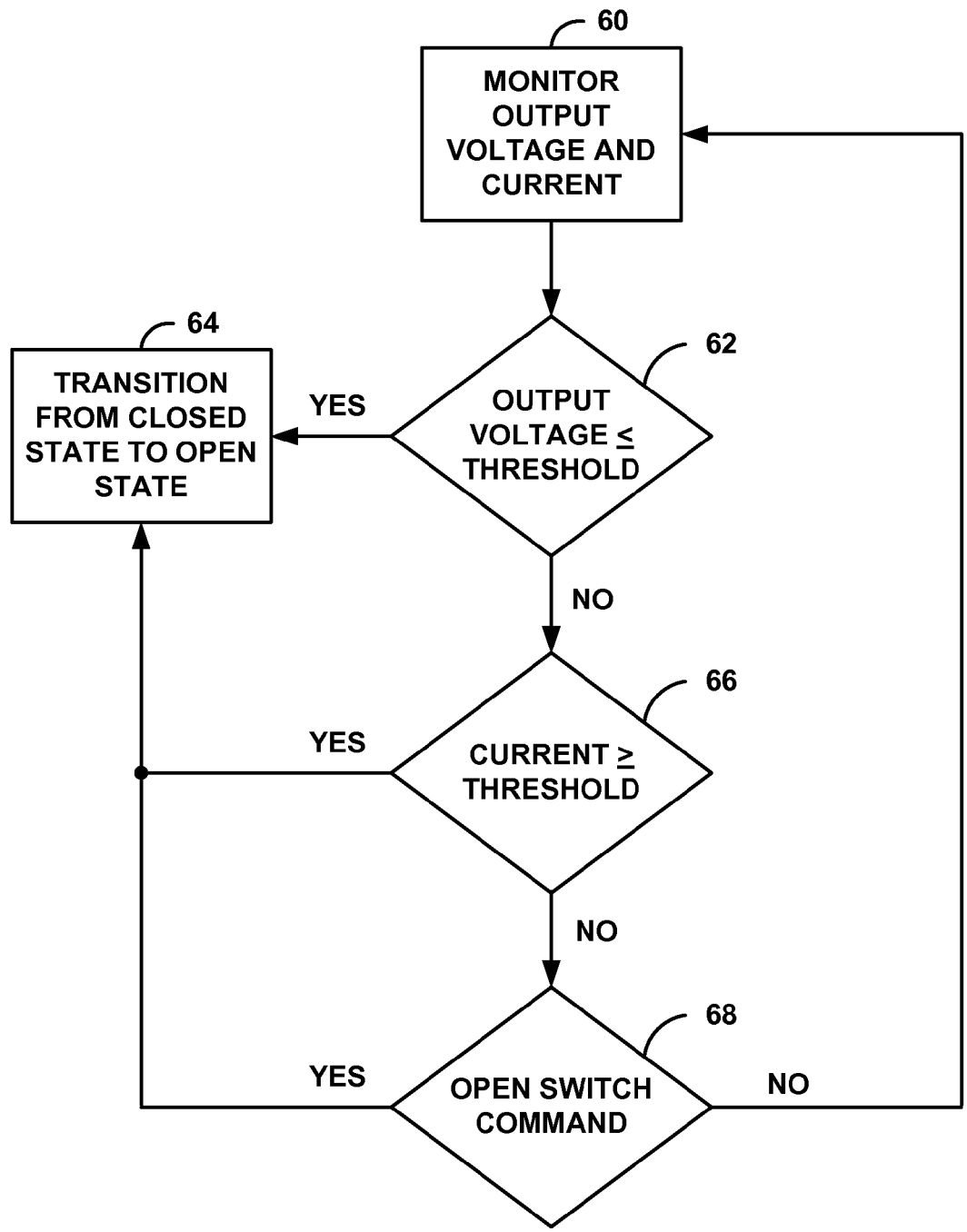
FIG. 5 is a flowchart illustrating another example technique to decouple the power source from the one or more units.

FIG. 5 is a flowchart illustrating another example technique to decouple power source 4 from the one or more units. For purposes of illustration, reference is made to FIG. 3. Switch controller 44 may monitor the output voltage of switch circuit 42, and switch state selector 46 may monitor the current delivered by power source 4 (60).

Switch controller 44 may determine whether the output voltage of switch circuit 42 is less than or equal to a predetermined voltage threshold (62). If the output voltage of switch circuit 42 is less than or equal to the predetermined voltage threshold (YES of 62), switch controller 44 may cause switch circuit 42 to transition from the closed state to the open state (64). For example, switch controller 44 may output a logic one to the gate terminal of switch circuit 42. The logic one to the gate terminal of switch circuit 42 may cause switch circuit 42 to transition from the closed state to the open state.

If the output voltage of switch circuit 42 is not less than or equal to the predetermined threshold voltage (NO of 62), switch state selector 46 may determine whether the current delivered by power source 4 is greater than or equal to a predetermined current threshold (66). If the current delivered by power source 4 is greater than or equal to the predetermined current threshold (YES of 66), switch state selector 46 may cause switch controller 44 to transition switch circuit 42 from the closed state to the open state. In response, switch circuit 42 may transition from the closed state to the open state (64).

If the current delivered by power source 4 is less than the predetermined current threshold, switch state selector 46 may determine whether switch state selector 46 received an open switch command (68). If switch state selector 46 received an open switch command (YES of 68), switch state selector 46 may cause switch controller 44 to transition switch circuit 42 from the closed state to the open state. In response, switch circuit 42 may transition from the closed state to the open state (64). If switch state selector 46 did not receive an open switch command, switch controller 44 may monitor the output voltage of switch circuit 42, and switch state selector may monitor the current delivered by power source 4 (60).

The flowchart of FIG. 5 is provided for illustration purposes, and should not be considered as limiting. Although FIG. 5 illustrates that block 62 precedes block 66 and that block 66 precedes block 68, aspects of this disclosure are not so limited. In some examples, block 62, block 66, and block 68 may occur in parallel. In some examples, block 62, block 66, and block 68 may occur in an order different than that shown in FIG. 5.

Figure 6:
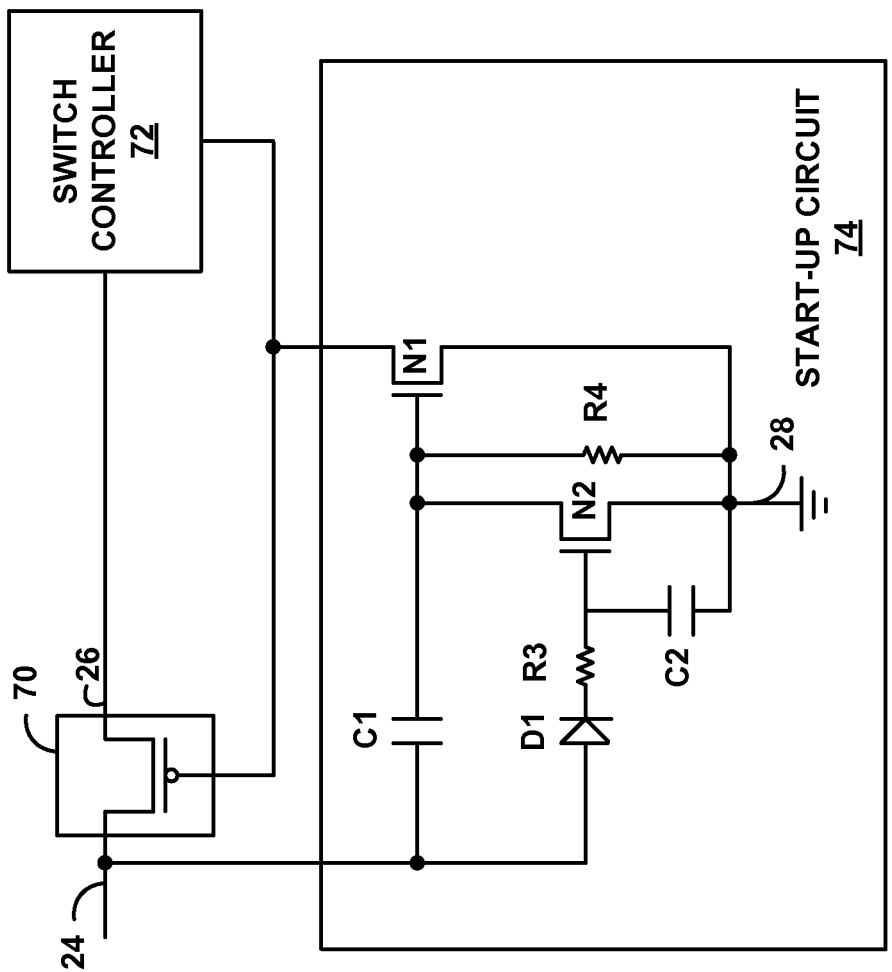
FIG. 6 is circuit diagram illustrating a start-up condition for a switch circuit.

FIG. 6 is circuit diagram illustrating a start-up condition for switch circuit 70. As illustrated in FIG. 6, switch circuit 70 is coupled to switch controller 72. Switch circuit 70 may be substantially similar to switch circuit 6, switch circuit 32, and switch circuit 42. Switch controller 72 may be substantially similar to switch controller 8, switch controller 34, and switch controller 44.

In some instances, it may possible that when power source 4 is initially coupled to switch circuit 70, switch circuit 70 may not transition to a known state. As an example, the gate terminal of switch circuit 70 may not transition to a voltage level that is substantially the same as the voltage level of ground node 28 so that switch circuit 70 is placed in a closed state. In these instances, the one or more units may be decoupled from power source 4, even though it may be desirable for the one or more units to be coupled to power source 4 upon power up.

In some examples, device 2 may include start-up circuit 74. Start-up circuit 74 may ensure that the gate terminal of the PFET of switch circuit 70 transitions to a voltage level that is substantially the same as the voltage level of ground node 28 so that switch circuit 70 is in a closed state when it is initially coupled to power source 4. Start-up circuit 74 is shown for illustration purposes only, and may not be required in every example of device 2. Furthermore, for purposes of illustration the various circuitry illustrated in FIGS. 1, 2, and 3 is not shown in FIG. 6.

When power source 4 is first coupled to switch circuit 70, the coupling may generate an initial transient voltage. Start-up circuit 74 may utilize the initial transient voltage to ensure that the voltage on the gate terminal of the PFET of switch circuit 70 is substantially the same as the voltage level of ground node 28.

The initial transient voltage may be AC coupled to the gate of transistor N1 via capacitor C1. Capacitor C1 may be a 3 pico-farad (pF) capacitor. The gate of transistor N1 may be coupled to ground node 28 via resistor R4. R4 may be a 6 mega-ohm resistor. The AC coupled initial transient voltage on the gate of transistor N1 may turn on transistor N1. When transistor N1 is turned on, the drain terminal of transistor N1 may cause gate terminal of the PFET of switch circuit 70 to be approximately the same as the voltage level of ground node 28. Simultaneously, power source 4 may charge up the gate terminal of transistor N2 via diode D1 and resistor R3. Resistor R3 may be a 6 mega-ohm resistor. Once the voltage at the gate terminal of transistor N2 reaches a threshold, the voltage at the gate terminal of transistor N1 may be approximately at the same voltage level as ground node 28. The voltage at the gate terminal of transistor N2 may be maintained with capacitor C2. Capacitor C2 may be a 3 pF capacitor.

In some examples, transistor N1 may not be on for very long, e.g., on the order of microseconds because of the voltage at the gate terminal of transistor N1 being reduced to the voltage level of ground node 28 via resistors R4 and R3. The duration that transistor N1 is on may be based on the amount of time it takes power source 4 to turn on transistor N2, which may be on the order of microseconds. In any event, transistor N1 is turned on long enough to initially close switch circuit 70 and to further place switch controller 72 in a state wherein switch controller 72 maintains switch circuit 70 is a closed state even after transistor N1 is no longer in an open state. This ensures that switch circuit 70 will always be powered up in a closed state. In some instances, the voltage level at the gate terminal of transistor N1 may be maintained even when a short develops in device 2, e.g., when a short develops within the one or more units. In the above example, start up circuit 74 is provided to ensure that upon initially coupling power source 4 to switch circuit 70, switch circuit 70 will be placed in a closed state. Other examples of start up circuit 74 and switch circuit 70 may be used to ensure that upon initially being coupled to power source 4, switch circuit 70 will always be placed in a closed state.

Figure 7:
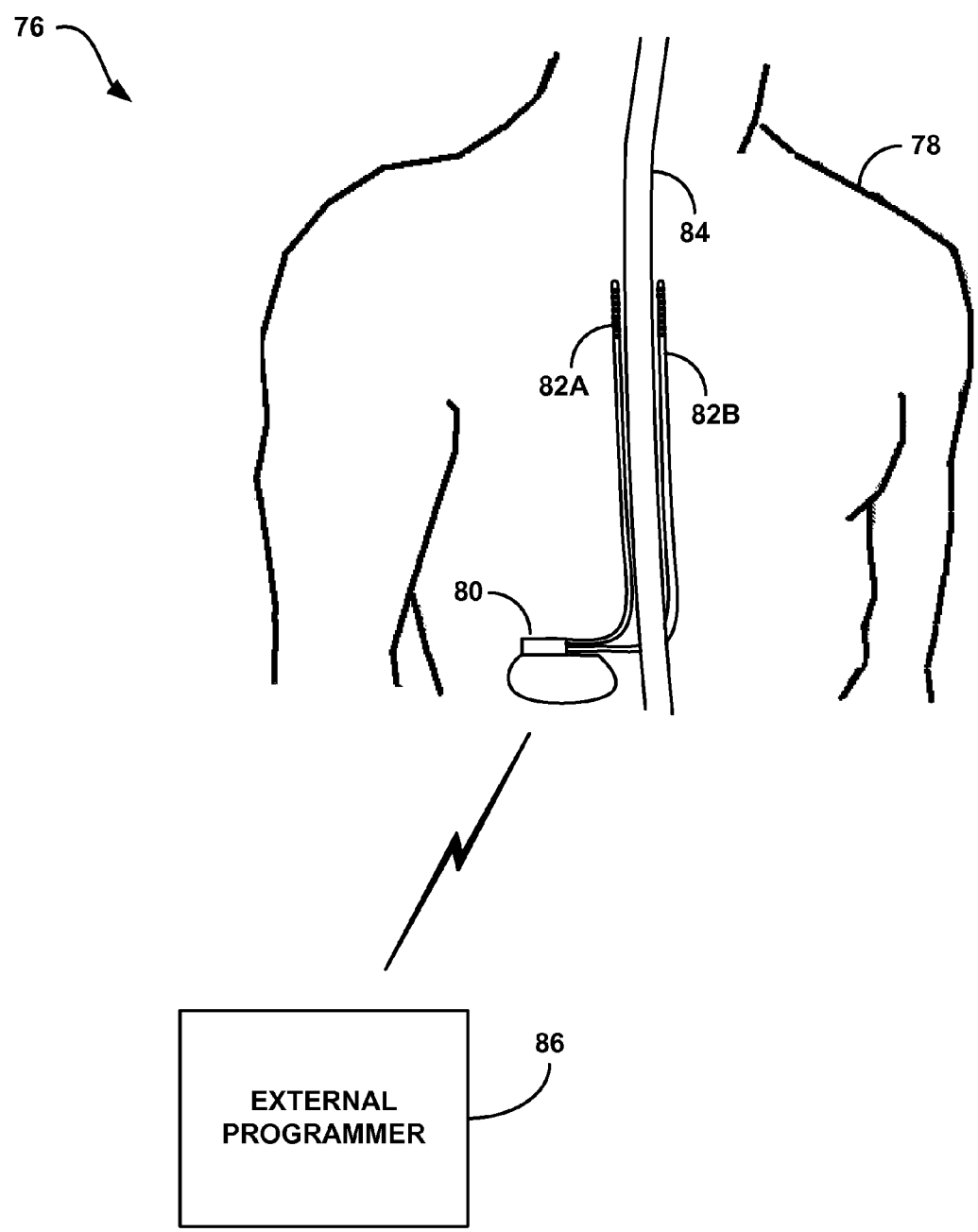
FIG. 7 is a schematic diagram illustrating an implantable medical device (IMD) system including an IMD and an external programmer.

FIG. 7 is a schematic diagram illustrating an implantable medical device (IMD) system including an IMD and an external programmer. As shown in FIG. 7, system 76 includes an implantable device 80 and an external programmer 86 shown in conjunction with patient 78. Implantable device 80 and external programmer 86 may be similar to device 2 (FIG. 1). Although FIG. 7 shows an implantable device 80 coupled to fully implanted leads 82A, 82B, the techniques described in this disclosure may be applied to external stimulators coupled to leads via percutaneous lead extensions.

As shown in FIG. 7, leads 82A, 82B are implanted adjacent a spinal cord 84 of patient 78, e.g., for spinal cord stimulation (SCS) to alleviate pain. However, the techniques described in this disclosure are applicable to leads implanted to target any of a variety of target locations within patient 78, such as leads carrying electrodes located proximate to spinal cord 114, pelvic nerves, peripheral nerves, the stomach or other gastrointestinal organs, or within the brain of a patient. Also, techniques of this disclosure are applicable to other IMDs, such as those that deliver substances, e.g., drugs, to a patient, such IMDs sometimes being referred to as implantable drug pumps.

In the example of FIG. 7, stimulation energy is delivered from device 80 to spinal cord 84 of patient 78 via one or more electrodes carried by axial leads 82A and 82B (collectively "leads 82") implanted within the patient. In various applications, such as spinal cord stimulation (SCS), the adjacent implantable leads 82 may have longitudinal axes that are substantially parallel to one another. Various combinations of electrodes carried by the leads 82 may be used to deliver electrical stimulation, including combinations of electrodes on a single lead or combinations of electrodes on both leads. Also, in some examples, electrodes may be carried by paddle leads in which an array of electrodes may be arranged in a two-dimensional pattern, e.g., as columns or rows of electrodes, on a common planar lead surface.

In the example of FIG. 7, leads 82 carry electrodes that are placed adjacent to the target tissue of spinal cord 84. In particular, leads 82 may be implanted in the epidural space adjacent spinal cord 84, and coupled to an implanted device 80. In the example of FIG. 7, stimulation energy may be delivered to spinal cord 84 to eliminate or reduce pain perceived by patient 78. However, device 80 may be used with a variety of different therapies, such as peripheral nerve stimulation (PNS), peripheral nerve field stimulation (PNFS), deep brain stimulation (DBS), cortical stimulation (CS), pelvic floor stimulation, gastric stimulation, and the like. The stimulation may be configured to alleviate a variety of symptoms or conditions such as chronic pain, tremor, Parkinson's disease, epilepsy, urinary or fecal incontinence, sexual dysfunction, obesity, or gastroparesis. The stimulation delivered by device 110 may take the form of stimulation pulses or continuous waveforms, and may be characterized by controlled voltage levels or controlled current levels, as well as pulse width and pulse rate in the case of stimulation pulses.

A user, such as a clinician, physician or patient 78, may interact with a user interface of external programmer 86 to program stimulator 80. Programming of device 86 may refer generally to the generation and transfer of commands, programs, or other information to control the operation of device 80. For example, programmer 86 may transmit programs, parameter adjustments, program selections, group selections, or other information to control the operation of device 80, e.g., by wireless telemetry. Parameter adjustments may refer to initial parameter settings or adjustments to such settings. A program may specify a set of parameters that define stimulation. A group may specify a set of programs that define different types of stimulation, which may be delivered simultaneously using pulses with independent amplitudes or on a time-interleaved basis.

In some cases, external programmer 86 may be a physician or clinician programmer if it is primarily intended for use by a physician or clinician. In other cases, external programmer 86 may be a patient programmer if it is primarily intended for use by a patient. In general, a physician or clinician programmer may support selection and generation of programs or parameters by a clinician for use by device 80, whereas a patient programmer may support more limited adjustment and selection of such programs or parameters by a patient during ordinary use.

Device 80 may be implanted in patient 78 at a location minimally noticeable to the patient. Alternatively, the device may be external to patient 108 and coupled to implanted leads via a percutaneous extension. For spinal cord stimulation (SCS), as an example, device 80 may be located, for example, in the lower abdomen, lower back, or other location to secure the stimulator. Leads 82 may be tunneled from device 80 through tissue to reach the target tissue adjacent to spinal cord 84 for stimulation delivery. At distal portions of leads 82 are one or more electrodes (not shown) that transfer stimulation energy from the lead to the tissue. The electrodes may be electrode pads on a paddle lead, circular (i.e., ring) electrodes, surrounding the body of leads 82, segmented electrodes arranged at different axial and rotational positions around a lead, conformable electrodes, cuff electrodes, or any other type of electrodes capable of forming unipolar, bipolar or multipolar electrode configurations.

The techniques described in this disclosure, including those attributed to switch circuit 6, switch controller 8, switch state selector 10, processor unit 12, voltage monitor unit 17, recharge circuit unit 22, or various constituent components, may be implemented, at least in part, in hardware, software, firmware or any combination thereof. For example, various aspects of the techniques may be implemented within one or more processors, e.g., processor unit 12, including one or more microprocessors, digital signal processors (DSPs), application specific integrated circuits (ASICs), field programmable gate arrays (FPGAs), or any other equivalent integrated or discrete logic circuitry, as well as any combinations of such components, embodied in programmers, such as physician or patient programmers, stimulators, image processing devices or other devices. The term "processor" or "processing circuitry" may generally refer to any of the foregoing logic circuitry, alone or in combination with other logic circuitry, or any other equivalent circuitry.

Such hardware, software, firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic data storage media, optical data storage media, or the like. The instructions may be executed to support one or more aspects of the functionality described in this disclosure.

In general, the techniques described in this disclosure can be applied to devices that are powered by one or more power sources such as batteries or capacitors. The techniques may be applied to medical devices such implantable medical devices configured to deliver neurostimulation or other electrical stimulation therapy via implanted electrode arrays, carried by leads or otherwise, located proximate to the spinal cord, pelvic nerves, peripheral nerves, the stomach or other gastrointestinal organs, or within the brain of a patient. The techniques described in this disclosure can be applied to medical devices that may not include electrodes to provide electrical stimulation. For examples, the techniques described in this disclosure can be applied to medical devices that provide medication or other therapeutic agents. The techniques described in this disclosure may also be applied to medical devices that are external to the patient, as well as medical devices that used to program other medical devices. The techniques described in this disclosure may also be applied to non-medical devices such as laptop computers, gaming consoles, mobile phones, personal digital assistants (PDAs), and other such devices.

Many aspects of the disclosure have been described. Various modifications may be made without departing from the scope of the claims. These and other aspects are within the scope of the following claims.

The invention claimed is:

1. A medical device comprising:
 a switch circuit comprising a source terminal, a drain terminal, and a gate terminal, wherein the source terminal is coupled to a power source;
 a switch circuit controller coupled directly to the drain terminal and the gate terminal of the switch circuit and configured to:
  monitor a voltage at the drain terminal of the switch circuit, and
  output a voltage to the gate terminal of the switch circuit to transition the switch circuit from a closed state to an open state when the voltage at the drain terminal of the switch circuit is less than a predetermined voltage threshold; and
 a switch state selector comprising:
  a sense resistor coupled to the power source and the source terminal of the switch circuit; and
  a current comparator configured to monitor a voltage across the sense resistor to monitor a current delivered by the power source, and transmit a command to the switch circuit controller instructing the switch circuit controller to output the voltage to the gate terminal of the switch circuit to transition the switch circuit from the closed state to the open state when the voltage across the sense resistor is greater than an offset.

2. The medical device of claim 1, wherein the switch circuit comprises a positive channel field effect transistor (PFET).

3. The medical device of claim 1, wherein the command comprises a first command, the medical device further comprising:
 a voltage monitor unit configured to monitor a voltage of the power source and transmit an open switch command to the switch state selector when the voltage of the power source reduces below a predetermined threshold,
 wherein the switch state selector transmits a second command to the switch circuit controller, in response to the open switch command, and
 wherein the switch circuit controller outputs the voltage to the gate terminal of the switch circuit to transition the switch circuit from the closed state to the open state, in response to the second command from the switch state selector.

4. The medical device of claim 1, wherein the command comprises a first command, the medical device further comprising:
 a processor unit configured to:
  determine whether the processor unit receives commands, within a time range, after the switch circuit transitions from the open state to the closed state; and
  transmit an open switch command to the switch state selector when the processor unit does not receive the commands within the time range,
 wherein the switch state selector transmits a second command to the switch circuit controller, in response to the open switch command, and
 wherein the switch circuit controller outputs the voltage to the gate terminal of the switch circuit to transition the switch circuit from the closed state to the open state, in response to the second command from the switch state selector.

5. The medical device of claim 1,
 wherein the command comprises a first command,
 wherein the switch state selector is configured to receive detected recharge energy and transmit a second command to the switch circuit controller to transition the switch circuit from the open state to the closed state,
 wherein the switch circuit controller is configured to output a voltage to the gate terminal of the switch circuit to ensure that the switch circuit is in the closed state, in response to the second command from the switch state selector.

6. The medical device of claim 1, wherein the voltage to transition the switch circuit from the closed state to the open state comprises a voltage at a voltage level of the power source.

7. The medical device of claim 1, further comprising one or more units, wherein the one or more units are coupled to the drain terminal of the switch circuit, and wherein the transition of the switch circuit from the closed state to the open state decouples the power source from the one or more units.

8. The medical device of claim 1, wherein a short within the medical device causes the voltage at the drain terminal of the switch circuit to be less than the predetermined voltage threshold.

9. A method comprising:
 monitoring a voltage at a drain terminal of a switch circuit, within a medical device, wherein the switch circuit comprises a source terminal coupled to a power source, a gate terminal, and the drain terminal;

directly outputting a voltage to the gate terminal of the switch circuit to transition the switch circuit from a closed state to an open state when the voltage at the drain terminal of the switch circuit is less than a predetermined voltage threshold;

monitoring a voltage across a sense resistor coupled to the power source and the source terminal of the switch circuit to monitor a current delivered by the power source; and causing the switch circuit to transition from the closed state to the open state when the voltage across the sense resistor is greater than an offset.

10. The method of claim 9, wherein the switch circuit comprises a positive channel field effect transistor (PFET).

11. The method of claim 9, further comprising:
monitoring a voltage of the power source; and
causing the switch circuit to transition from the closed state to the open state when the voltage of the power source reduces below a predetermined threshold.

12. The method of claim 9, further comprising:
determining whether a processor unit receives commands, within a time range, after the switch circuit transitions from the open state to the closed state; and
causing the switch circuit to transition from the closed state to the open state when the processor unit does not receive the commands within the time range.

13. The method of claim 9, further comprising:
detecting a recharge energy; and
causing the switch circuit to transition from the open state to the closed state when the recharge energy is detected.

14. The method of claim 9, wherein the voltage to transition the switch circuit from the closed state to the open state comprises a voltage at a voltage level of the power source.

15. The method of claim 9, wherein the medical device includes one or more units, and wherein the transition of the switch circuit from the closed state to the open state decouples the power source from the one or more units.

16. The method of claim 9, wherein a short with in the medical devices causes the voltage at the drain terminal of the switch circuit to be less than the predetermined voltage threshold.

17. A medical device comprising:
means for monitoring a voltage at a drain terminal of a switch circuit, wherein the switch circuit comprises a source terminal coupled to a power source, a gate terminal, and the drain terminal;
means for directly outputting a voltage to the gate terminal of the switch circuit to transition the switch circuit from a closed state to an open state when the voltage at the drain terminal of the switch circuit is less than a predetermined voltage threshold;
means for monitoring a voltage across a sense resistor coupled to the power source and the source terminal of the switch circuit to monitor a current delivered by the power source; and means for causing the switch circuit to transition from the closed state to the open state when the voltage across the sense resistor is greater than an offset.

18. The medical device of claim 17, wherein the switch circuit comprises a positive channel field effect transistor (PFET).

19. The medical device of claim 17, further comprising:
means for monitoring a voltage of the power source; and
means for causing the switch circuit to transition from the closed state to the open state when the voltage of the power source reduces below a predetermined threshold.

20. The medical device of claim 17, further comprising:
means for determining whether a processor unit receives commands, within a time range, after the switch circuit transitions from the open state to the closed state; and
means for causing the switch circuit to transition from the closed state to the open state when the processor unit does not receive the commands within the time range.

21. The medical device of claim 17, further comprising:
means for detecting a recharge energy; and
means for causing the switch circuit to transition from the open state to the closed state when the recharge energy is detected.

22. The medical device of claim 17, wherein the voltage to transition the switch circuit from the closed state to the opened state comprises a voltage at a voltage level of the power source.

23. The medical device of claim 17, wherein the medical device includes one or more units, and wherein the transition of the switch circuit from the closed state to the open state decouples the power source from the one or more units.

24. The medical device of claim 17, wherein a short with in the medical devices causes the voltage at the drain terminal of the switch circuit to be less than the predetermined voltage threshold.

25. A computer-readable storage medium comprising instructions that cause one or processors, in a medical device, to:
monitor a voltage at a drain terminal of a switch circuit, wherein the switch circuit comprises a source terminal coupled to a power source, a gate terminal, and the drain terminal;
directly output a voltage to the gate terminal of the switch circuit to transition the switch circuit from a closed state to an open state when the voltage at the drain terminal of the switch circuit is less than a predetermined voltage threshold;
monitor a voltage across a sense resistor coupled to the power source and the source terminal of the switch circuit to monitor a current delivered by the power source; and
cause the switch circuit to transition from the closed state to the open state when the voltage across the sense resistor is greater than an offset.

* * * * *